Jan. 20, 1953  E. P. HARRIS ET AL  2,625,979
APPARATUS FOR MAKING FLEXIBLE HOSE
Filed Nov. 3, 1950  2 SHEETS—SHEET 1
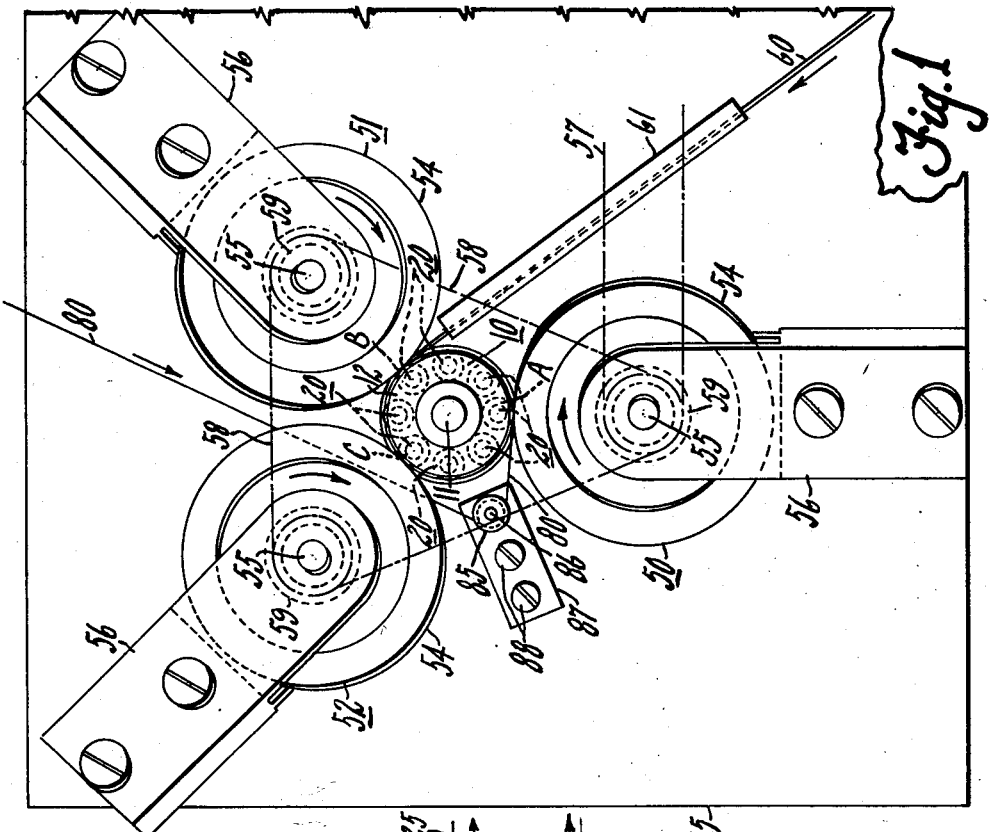
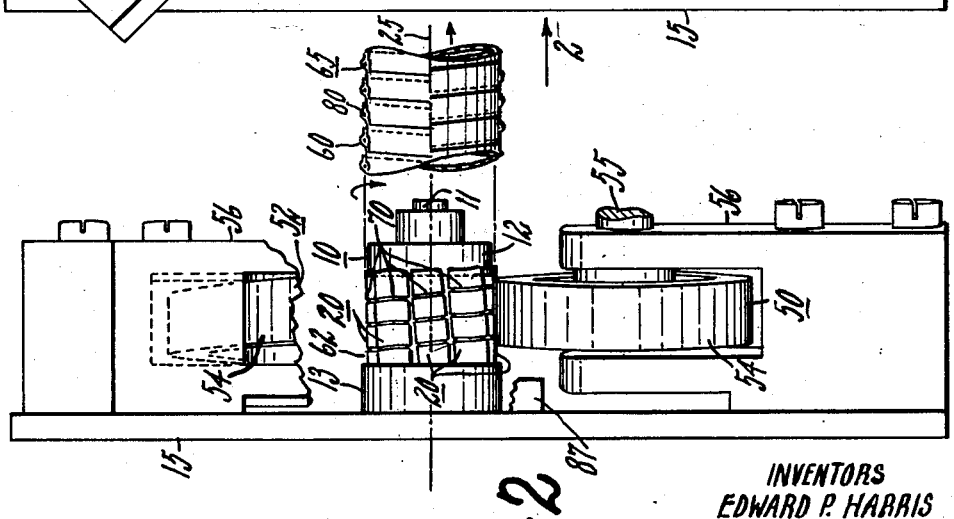
INVENTORS
EDWARD P. HARRIS
FREDERICK W. SAMPSON
BY Willits Hardman & Fehr
THEIR ATTORNEYS Jan. 20, 1953 — E. P. HARRIS ET AL — 2,625,979
APPARATUS FOR MAKING FLEXIBLE HOSE
Filed Nov. 3, 1950 — 2 SHEETS—SHEET 2

INVENTORS
EDWARD P. HARRIS
FREDERICK W. SAMPSON
BY Willets, Hardman & Fehr
THEIR ATTORNEYS Patented Jan. 20, 1953

2,625,979

UNITED STATES PATENT OFFICE 2,625,979

APPARATUS FOR MAKING FLEXIBLE HOSE

Edward P. Harris and Frederick W. Sampson, Dayton, Ohio, assignors to General Motors Corporation, Detroit, Mich., a corporation of Delaware Application November 3, 1950, Serial No. 193,801

7 Claims. (Cl. 154—6)

This invention relates to a method and apparatus for making a helically wrapped flexible hose.

An object of the present invention is to provide a simple and efficient apparatus whereby continuous lengths of a flat section tape of any suitable somewhat adhesive flexible material and a reinforcing wire may be wrapped together in overlapping relation to continuously form a helically wrapped hose structure.

Another object is to provide such an apparatus which has only a relatively short stub mandrel upon which the tape and reinforcing wire are continuously wrapped into a hose structure and the formed hose structure continuously passed automatically endwise from the end of said short mandrel without further interior support for maintaining its circular cross section.

Highly important features of the apparatus of this invention are:

1. The stub mandrel as a whole is non-rotating but has rotatably mounted in a general cylindrical arrangement thereupon a series of closely spaced small rollers so that the radially outermost surfaces of said rollers taken together substantially delineate an imaginary cylindrical surface and provide the effective wrapping surface of said mandrel.

2. The axis of each of said mandrel rollers is inclined relative to the line of generation of said cylindrical surface at an angle substantially equal to the pitch angle of the wrapped helix to be formed upon the mandrel. Hence the hose structure while being formed upon said mandrel simultaneously travels endwise axially along said mandrel by rolling upon said angularly inclined rollers. Thus the fully formed hose structure simply travels endwise from the end of the relatively short mandrel while said rollers roll against the inside surface of the hose.

3. The exterior driving rollers each rolls upon the tape and reinforcing wire in direct alignment with the direction of travel thereof and presses the tape and wire firmly together into an integrated hose structure as they pass together around the mandrel.

4. The exterior driving rollers each revolves about a stationary axis which is parallel with the stationary axis of the particular opposed interior roller against which it presses the hose structure passing therebetween. Thus substantially pure rolling action is obtained upon the hose structure passing between each of the exterior driving rollers and its opposed interior roller.

These driving rollers supply the driving friction for moving the flat tape and reinforcing wire around the mandrel and for causing the formed hose structure to rotate around said mandrel by rolling upon said interior rollers. These driving rollers also urge the rotating hose to travel endwise axially along said mandrel.

Further objects and advantages of the present invention will be apparent from the following description, reference being had to the accompanying drawings, wherein a preferred embodiment of the present invention is clearly shown.

In the drawings:

Fig. 1 is a diagrammatic side elevation of an apparatus made according to this invention.

Fig. 4 is a section taken on line 4—4 of Fig. 3 which passes through the longitudinal axial centers of the two interior rollers shown in Fig. 3. For clearness sake, Fig. 4 omits any attempt to show the small angularity of the eight interior rollers and the three exterior driving rollers.

Similar reefrence numerals designate similar parts throughout the drawings.

Figure 2:
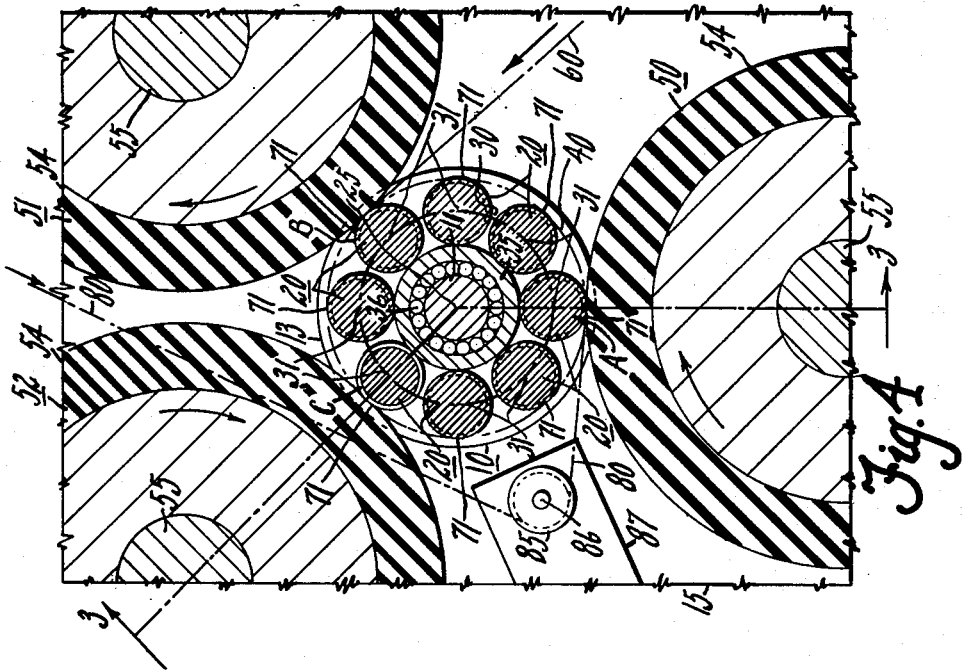
Fig. 2 is an edge view of Fig. 1 looking in the direction of arrow 2, certain parts being broken away, and illustrates how the formed hose structure rotates around the non-rotating stub mandrel upon which it is formed and progressively passes endwise therefrom.

The stub mandrel is designated as a whole by 10. Mandrel 10 comprises a central stationary bar 11 upon which is mounted two annular roller supports 12 and 13 rigidly fixed to bar 11 by the tapered pins 14. Roller support 13 is strongly fixed to the heavy metal base plate 15 by a series of cap screws 16. Thus the two spaced annular supports 12 and 13 of mandrel 10 are held rigidly fixed to the stationary base plate 15. A series of mandrel rollers 20, eight being shown in the form illustrated in the drawings, are rotatably mounted between the two supports 12 and 13 in peripherally evenly spaced generally cylindrical arrangement as follows. The end journals 21 and 22 of rollers 20 have angularly inclined bearing sockets 23 and 24 in supports 12 and 13 respectively. The longitudinal centers 31 of the eight rollers 20 are equidistant from the longitudinal axis 25 of bar 11 (see Fig. 4) and are evenly spaced peripherally around said axis 25. However the axes 26 of rollers 20 are not parallel to said axis 25. The rollers 20 are so mounted that the axis 26 of each roller 20 is inclined at the pitch angle of the helix of the hose to be formed (for example about three degrees) to a radial plane passing through axis 25 and intersecting the roller axis 26 at its center 31. Now viewing Fig. 4, consider an imaginary cylindrical surface 30 concentric with axis 25 and passing through the longitudinal centers 31 of all the rollers 20, as shown in Fig. 4. The line of generation of this cylindrical surface 30 of course remains parallel to the axis 25 in all positions thereof. The axis 26 of each roller 20 is inclined (at said small pitch angle) to the line of generation of said cylindrical surface 30 which intersects axis 26 of said roller 20. The uniform direction of inclination of rollers 20 is best shown in Fig. 2.

Now in the roller assembly the outermost surfaces of the eight angularly disposed rollers 20 are made to lie in an imaginary cylindrical surface 40 (see Fig 4) concentric with axis 25. This can be done by tapering the diameter of each roller 20 accordingly, from a maximum at its longitudinal center point 31 to a minimum at its two ends, that is, each roller 20 is slightly tapered toward its ends from its longitudinal center point due to the fact that its inclined axis 26 obviously extends somewhat closer to cylindrical surface 40 at its two ends than it does at its central point 31. Thus when rollers 20 rotate on their own axes 26 their outermost surfaces in the roller assembly will always lie in the cylindrical surface 40. Thus the outermost surfaces of the closely spaced rollers 20 will effectively delineate the cylindrical surface 40. Now when the tape and reinforcing wire to be used with this apparatus are wrapped around the outside of the assembly of closely spaced rollers, said assembly of rollers will serve in effect as a cylindrical mandrel having the diameter of cylindrical surface 40. Thus the outer surfaces of rollers 20 form the wrapping surface of mandrel 10.

Figure 3:
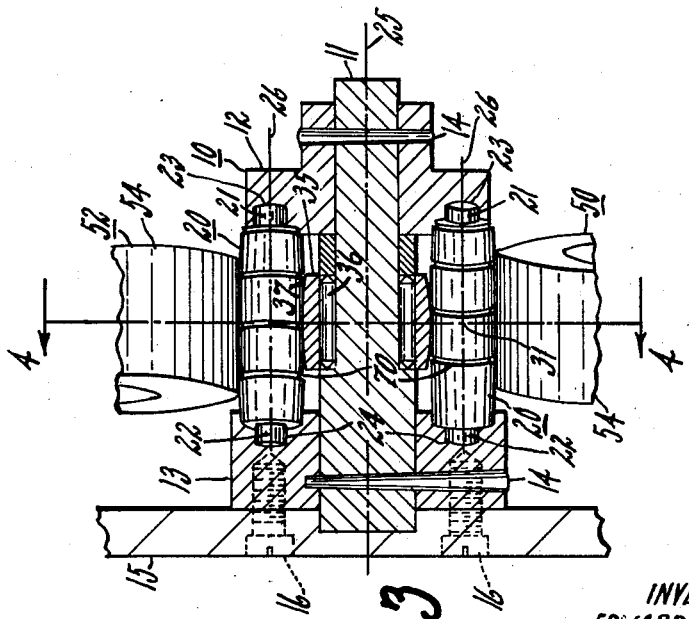
Fig. 3 shows on an enlarged scale a section through the stub mandrel taken on line 3—3 of Fig. 4. The axes of the two small angularly inclined interior rollers and the two driving rollers pressing thereupon, shown in perspective in Fig. 3, are cut at their longitudinal centers by line 3—3 of Fig. 4.

The central portions of all of the rollers 20 bear directly upon a centrally located freely rotating bearing ring 35 which is suitably mounted upon the central portion of stationary bar 11 by means of the needle roller bearing 36. Bearing ring 35 has a slightly crowned bearing surface 37 (see Fig. 3) so that the slight angularity of rollers 20 which roll thereupon will result in very little relative sliding and wear between these parts. Bearing ring 35 preferably takes the radially inward load upon rollers 20 during operation of the apparatus, while the roller journals 21 and 22 at all times maintain the rollers 20 each angularly inclined relative to axis 25 as described above. Thus all the rollers 20 (while rotating about their own axes 26) will roll upon bearing ring 35 and cause said ring to rotate freely upon its needle bearing 36. This of course further urges the rollers 20 to all rotate at the same speed during operation of the apparatus.

Three exterior driving rollers 50, 51 and 52 are suitably rotatably mounted upon the forked brackets 56 which are rigidly fixed to the stationary base 15 by suitable screws or bolts. The pivot shaft 55 of each of the three driving rollers 50, 51 and 52 extends parallel to the axis of the particular roller 20 against which the driving roller presses in each case. That is, driving roller 50 has its rotating shaft 55 extending parallel to the inclined axis 26 of the particular roller 20 marked "A" in Fig. 4, roller 51 has its shaft 55 extending parallel to the inclined axis 26 of the particular roller 20 marked "B," and roller 52 has its shaft 55 extending parallel to the inclined axis 26 of the particular roller 20 marked "C." Hence the somewhat yieldable solid rubber tires 54 of the three driving rollers can each have a pure rolling action upon the mandrel roller 20 against which it presses.

Driving rollers 50, 51 and 52 are all driven at the same constant speed by any suitable means. In Fig. 1, the roller 50 is diagrammatically shown as being driven by a suitable belt or sprocket chain 57 leading from a suitable power source (not shown). The three rollers 50, 51 and 52 are geared together by a suitable endless sprocket chain 58 extending around identical sprocket wheels 59 fixed to the shafts 55 of said rollers. Thus all three driving rollers 50, 51 and 52 are positively driven at the same peripheral speed, and of course, the three particular rollers 20 (marked "A," "B" and "C" in Fig. 1) against which the yieldable rubber tires 54 of these driving rollers press are also driven at substantially this same peripheral speed.

The flat section tape 60 is continuously fed onto rollers 20 of mandrel 10 through a suitable guide chute 61 (see Fig. 1) at the pitch angle of the helix to be formed by wrapping tape 60 around mandrel 10, which pitch angle is equal to the above described angle of inclination of roller 20. Thus tape 60 is fed between the roller 20 (marked "B" in Fig. 1) and its driving roller 51 in direct alignment with the direction of travel of the otherwise contacting surfaces of said rollers. Hence the flat section tape 60 will pass smoothly between said roller 20 and driving roller 51 with a pure rolling action over the full width of tape 60. As tape 60 passes progressively around mandrel 10 it passes over each roller 20 at this same pitch angle of the helix into which the tape is being wrapped, hence the flat section tape 60 passes over each roller 20 with a pure rolling action since the direction of travel of tape 60 is always at right angles to the axis of the roller 20 over which it is passing at that point. The width of tape 60 is such that adjacent turns thereof overlap one another the desired amount to give the desired overlapping helically wrapped hose structure. Tape 60 is first fed onto the end of mandrel 10 adjacent the fixed roller support 13 (that is, at its left end 62 as viewed in Fig. 2), and thence tape 60 progresses over rollers 20 in even helically wrapped form for several complete turns around mandrel 10, for example, about three turns. Since the adjacent turns of tape 60 overlap one another as it is wrapped helically around mandrel 10, it will form the cylindrical hose 65 (see Fig. 2) which will pass axially from the right end (as viewed in Fig. 2) of said mandrel 10. The outer pheriphery of the stationary roller support 12 is made to fit loosely within the inside diameter of the formed hose 65 as it continues to rotate and moves in an axial direction from the end of mandrel 10. Any suitable sort of slightly adhesive tape such as is ordinarily used at present in making wrapped flexible hose may be used with this apparatus. Preferably a textile fabric tape 60 coated on one or both sides with an uncured vulcanizable rubber or rubber-like material is used. If so desired such a tape may have a flexible reinforcing wire already incorporated therein prior to its being fed onto mandrel 10 in the apparatus so far described herein.

But preferably the flat section tape 60 is wrapped and the reinforcing wire simultaneously embedded therein by means which will now be described. The rollers 20 each have several peripheral grooves 70 therein of such depth and relative locations on the different rollers 20 as to positively guide a continuous length reinforcing wire 80 into the desired helical form when said wire is wrapped around mandrel 10. The grooves 70 each extends in a direct peripheral direction around its inclined roller 20, hence the rotation of said inclined rollers 20 on their own axes will not change the position of any groove 70 at the outer lines 71 where the rollers 20 lie tangent to the imaginary cylindrical surface 40 (see Fig. 4). Now rollers 20 respectively have their grooves 70 differently located along the lengths thereof so that taken together, said grooves will outline a helical path along the cylindrical surface 40 at all times regardless of the rotation of the rollers 20 about their own axes. The pitch angle of this helical path is made equal to the pitch angle of the helically wrapped tape 60. Thus when a reinforcing wire 80 is wrapped around mandrel 10 and held guided by grooves 70 into said helical path along the length of rollers 20, said wire 80 will form a helix having the same pitch as the helically wrapped tape 60. In other words, tape 60 and the reinforcing wire 80 may be wrapped together around mandrel 10 and, so long as wire 80 is correctly guided into said helical path, the tape and wire will continue to be wrapped together without relative lateral displacement between said tape and wire.

Fig. 4 shows wire 80 being fed to mandrel 10 between driving roller 50 and its adjacent roller "A" tangent thereto. Wire 80 initially passes into groove 70 on roller "A." The tape 60 is fed to mandrel 10 and passes between driving roller 51 and its adjacent roller "B" tangent thereto. During the first turn of tape 60, it passes between the entering wire 80 and the roller 20 marked "A," hence thereafter both tape 60 and wire 80 will be wrapped together into the overlapping helical hose structure 65 wherein the wire will be embedded between two adjacent turns of tape 60. Tape 60 must have such width that after it passes from roller 51 around to roller 50 (about 225 degreees) an edge of said tape 60 will underlie the entering wire 80, hence the lateral width of tape 60 must be materially greater than the distance between two adjacent turns of wire 80. The underlying tape 60 will be partially pressed down into grooves 70 by the pressure of wire 80 thereupon but grooves 70 have such depth and cross section that wire 80 can still be properly guided by grooves 70.

In Fig. 1, wire 80 is shown as first passing under tension around the wire-forming grooved pulley 85 having such a diameter as to progressively bend and give the wire a slight permanent set and cause it to inherently tend to spring into a coiled shape having a diameter preferably somewhat larger than that of the final helix into which it is formed on mandrel 10. Thus in the final wrapped hose 65, the helically coiled wire reinforcement will inherently have a tendency to expand in diameter and thereby always maintain the wrapped tape 60 under the desired tension. The wire-forming pulley 85 rotates freely on its pivot pin 86 which is held stationary by a suitable bracket 87 fixed to base plate 15 by screws or bolts 88. Of course, any other suitable and well known form of wire-forming device may be substituted for the single wire-forming pulley 85 to cause wire 80 to inherently tend to coil up into a helix approximating its final helical form in the wrapped hose 65.

In operation of the apparatus, as the inclined driving rollers 50, 51 and 52 are rotated by the sprocket chain 57, their wide slightly yieldable rubber treads 54 frictionally engage the outer surfaces of tape 60 over several turns thereof and so quite positively drive the entire wrapped structure (of tape 60 and wire 80) around mandrel 10 by pure rolling upon the rollers 20 of said mandrel. Any small helical ridges in the wrapped hose 65 (which may be caused by the wire 80 being embedded therein) will not adversely affect the driving frictional engagement of the wide rubber treads 54 with the outer surface of hose 65, since such ridges will readily embed themselves in the yieldable rubber tires or treads 54. The formed hose 65 continuously advances axially (to the right as viewed in Fig. 2) as it is formed on mandrel 10, due to the inclination of the interior rollers 20 and the exterior drive rollers 50, 51 and 52, as above described, and of course continues to rotate on its axis 25 while so advancing. The rotating hose 65 may be passed in continuous length from the mandrel 10 (over suitably spaced conveyor rollers or other supporting means) through a suitable curing chamber which will vulcanize the vulcanizable materials in the overlapping tape 60, and thereby provide a strong flexible integrated hose structure in continuous length. Or, if so desired, hose 65 may be cut into convenient lengths as it passes from mandrel 10, which lengths may be later cured in any suitable known manner.

While the embodiment of the present invention as herein disclosed, constitutes a preferred form, it is to be understood that other forms might be adopted.

What is claimed is as follows:

1. In an apparatus for making a flexible hose by wrapping a flat section tape and reinforcing wire together into a helix, in combination, a stub mandrel upon which said tape and wire are wrapped, said mandrel comprising a stationary holder having a series of interior rollers rotatably mounted thereupon in fixed peripherally spaced locations and in a generally cylindrical arrangement, said rollers having their outermost surfaces substantially lying in and effectively delineating an imaginary cylindrical surface concentric with the longitudinal axis of said mandrel, said rollers each having its own axis inclined relative to the line of generation of said cylindrical surface at the pitch angle of the helix to be formed, said interior rollers having peripheral grooves therein so arranged as to guide the reinforcing wire into helical form as it passes progressively from roller to roller around said mandrel, means for continuously leading the reinforcing wire to said grooves on said mandrel, guide means for continuously passing a flat section tape onto said mandrel in a direction substantially at right angles to the axis of the contacting interior roller thereon, and at least one exterior driving roller for frictionally driving said tape in its helical direction of movement and causing said tape to wrap helically around said mandrel with successive turns thereof mutually overlapping to form an integrated hose structure.

2. In an apparatus for wrapping continuous lengths of a flat section tape and a reinforcing wire together into a helix to form a hose, in combination, a stub mandrel around which said tape and wire are continuously helically wrapped, said mendrel comprising a stationary holder upon which are mounted in a generally cylindrical arrangement a series of closely spaced interior rollers arranged so that the outermost surfaces of all of said rollers in the cylindrical arrangement effectively delineate a cylindrical surface concentric with the longitudinal axis of said mandrel, said interior rollers each being rotatable on its own axis and having its axis inclined relative to the line of generation of said cylindrical surface at the pitch angle of the helix to be formed, said rollers having peripheral generally helically arranged grooves therein so arranged relative to one another as to substantially guide the reinforcing wire into a wrapped helix as said wire moves from roller to roller around said mandrel, means for continuously leading said wire onto said helically arranged grooves, means for continuously leading the flat section tape onto said mandrel tangentially to one of said interior rollers and in alignment with the direction of movement of the tape-contacting surface of said roller, said tape and wire being led onto said mandrel in mutually overlapping relation, and at least one exterior driving roller arranged to press said tape upon one of said interior rollers and drive said tape and wire together around said mandrel into helical form by substantially pure rolling upon said inclined interior rollers.

3. In an apparatus for wrapping continuous lengths of a flat section tape and a reinforcing wire together into a helix to form a hose, in combination, a stub mandrel around which said tape and wire are continuously helically wrapped, said mandrel comprising a stationary holder upon which are mounted in a generally cylindrical arrangement a series of closely spaced interior rollers arranged so that the outermost surfaces of all of said rollers in the cylindrical arrangement effectively delineate a cylindrical surface concentric with the longitudinal axis of said mandrel, said interior rollers each being rotatable on its own axis and having its axis inclined relative to the line of generation of said cylindrical surface at the pitch angle of the helix to be formed, said rollers having peripheral generally helically arranged grooves therein so arranged relative to one another as to substantially guide the reinforcing wire in to a wrapped helix as said wire moves from roller to roller around said mandrel, means for continuously leading said wire onto said helically arranged grooves, means for continuously leading the flat section tape onto said mandrel tangentially to one of said interior rollers and in alignment with the direction of movement of the tape-contacting surface of said roller, said tape and wire being led onto said mandrel in mutually overlapping relation, and a plurality of exterior driving rollers spaced peripherally around said mandrel and each being adapted to yieldably press upon one of said interior rollers for compressing the overlapping portions of said tape and wire into adhering relationship at a plurality of different areas around the periphery of said mandrel and simultaneously moving said tape and wire together around said mandrel by rolling directly upon said interior rollers.

4. In an apparatus for wrapping continuous lengths of a flat section tape and a reinforcing wire together into a helix to form a hose, in combination, a stub mandrel around which said tape and wire are continuously helically wrapped, said mandrel comprising a stationary holder upon which are mounted in a generally cylindrical arrangement a series of closely spaced interior rollers arranged so that the outermost surfaces of all of said rollers in the cylindrical arrangement effectively delineate a cylindrical surface concentric with the longitudinal axis of said mandrel, said interior rollers each being rotatable on its own axis and having its axis inclined relative to the line of generation of said cylindrical surface at the pitch angle of the helix to be formed, said rollers having peripheral generally helically arranged grooves therein so arranged relative to one another as to substantially guide the reinforcing wire into a wrapped helix as said wire moves from roller to roller around said mandrel, means for continuously leading said wire onto said helically arranged grooves, means for continuously leading the flat section tape onto said mandrel tangentially to one of said interior rollers and in alignment with the direction of movement of the tape-contacting surface of said roller, said tape and wire being led onto said mandrel in mutually overlapping relation, and at least one exterior driving roller arranged to press said tape upon one of said interior rollers and drive said tape and wire together around said mandrel into helical from by substantially pure rolling upon said inclined interior rollers, said exterior driving roller having its axis substantially parallel with the axis of said one inner roller against which it presses.

5. In an apparatus for wrapping continuous lengths of a flat section tape and a reinforcing wire together into a helix to form a hose, in combination, a stub mandrel around which said tape and wire are continuously helically wrapped, said mandrel comprising a stationary holder upon which are mounted in a generally cylindrical arrangement a series of closely spaced interior rollers arranged so that the outermost surfaces of all of said rollers in the cylindrical arrangement effectively delineate a cylindrical surface concentric with the longitudinal axis of said mandrel, said interior rollers each being rotatable on its own axis and having its axis inclined relative to the line of generation of said cylindrical surface at the pitch angle of the helix to be formed, said rollers having peripheral generally helically arranged grooves therein so arranged relative to one another as to substantially guide the reinforcing wire into a wrapped helix as said wire moves from roller to roller around said mandrel, means for continuously leading said wire onto said helically arranged grooves, means for continuously leading the flat section tape onto said mandrel tangentially to one of said interior rollers and in alignment with the direction of movement of the tape-contacting surface of said roller, said tape and wire being led onto said mandrel in mutually overlapping relation, and a plurality of exterior driving rollers spaced peripherally around said mandrel and each being adapted to yieldably press upon one of said interior rollers for compressing the overlapping portions of said tape and wire into adhering relationship at a plurality of different areas around the periphery of said mandrel and simultaneously moving said tape and wire together around said mandrel by rolling directly upon said interior rollers, each of said driving rollers having its axis parallel with the axis of the adjacent inner roller against which it presses.

6. In an apparatus for wrapping continuous lengths of a flat section tape and a reinforcing wire together to form a helically wrapped hose structure, in combination, a mandrel around which said tape and wire are helically wrapped, said mandrel comprising a stationary holder having a series of peripherally spaced rollers rotatably mounted in fixed location thereupon in a cylindrical arrangement so that the outermost surfaces of said rollers delineate an imaginary cylindrical surface and form the effectively cylindrical wrapping surface of said mandrel, said rollers each having its own axis inclined relative to the line of generation of said cylindrical surface at the pitch angle of the helically wrapped hose to be formed upon said mandrel.

7. In an apparatus for wrapping a flat section tape into a helically wrapped hose structure, in combination, a mandrel around which said tape is helically wrapped, said mandrel comprising a stationary holder having a series of peripherally spaced rollers rotatably mounted on fixed axes thereupon in a generally cylindrical arrangement so that the outermost surfaces of said rollers delineate an imaginary cylindrical surface and form an effectively cylindrical wrapping surface for said mandrel, said rollers each having its own axis inclined relative to the line of generation of said imaginary cylindrical surface at the pitch angle of the helix of the helically wrapped hose structure to be formed upon said mandrel.

EDWARD P. HARRIS.
FREDERICK W. SAMPSON.

REFERENCES CITED

The following references are of record in the file of this patent:

UNITED STATES PATENTS

| Number | Name | Date |
|---|---|---|
| 1,883,401 | Rolfs et al. | Oct. 18, 1932 |
| 2,539,853 | Meyers et al. | Jan. 30, 1951 |

FOREIGN PATENTS

| Number | Country | Date |
|---|---|---|
| 593,451 | Great Britain | Oct. 16, 1947 |